(12) United States Patent
Egle

(10) Patent No.: US 6,454,366 B1
(45) Date of Patent: Sep. 24, 2002

(54) CARTRIDGE ASSEMBLY FOR A TRACK CHAIN

(75) Inventor: Kevin M. Egle, Medford, WI (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/940,022

(22) Filed: Aug. 27, 2001

(51) Int. Cl.[7] .............................................. B62D 55/21
(52) U.S. Cl. ...................................... 305/202; 305/105
(58) Field of Search ................................. 305/100, 102, 305/103, 104, 105, 106, 202, 59

(56) References Cited

U.S. PATENT DOCUMENTS 4,126,359 A * 11/1978 Holze
5,183,318 A * 2/1993 Taft et al.

* cited by examiner

Primary Examiner—Russell D. Stormer
(74) Attorney, Agent, or Firm—Maginot, Addison & Moore; Calvin E Glastetter; Jeff A Greene

(57) ABSTRACT

A cartridge assembly is provided that connects first and second links of a track chain of a track type work machine. The cartridge assembly includes first and second collars and a track pin. The first collar is positioned within a first hole of the first link and the second collar is positioned within a second hole of the second link. The first collar is fixed in relation to the first link and the track pin and the second collar is fixed in relation to the second link and is allowed to move relative to the track pin.

20 Claims, 3 Drawing Sheets

CARTRIDGE ASSEMBLY FOR A TRACK CHAIN

TECHNICAL FIELD

This invention relates generally to track type work machines, and more particularly to a cartridge assembly for a track chain of a track type work machine.

BACKGROUND

The track chain of track type work machines generally include a pair of parallel chains, with each parallel chain being made up of a series of entrained track links. The entrained track links cooperate to form a number of track joints which allow the necessary relative movement between adjacent links. For example, adjacent links must move relative to one another when the track chain rotates about a sprocket of the track type work machine.

The track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the track links.

One prior art track seal assembly design used to accomplish the aforementioned functions employs a track link having a groove defined therein. A sealing member is positioned within the groove and then the sealing member is axially urged into sliding sealing engagement against a polished bearing surface by a resilient rubber load ring. However, a number of problems have been encountered using the above described arrangement.

One such problem relates to grooving of the bearing surface. The mixtures of various abrasive particles found in the working environment of a track chain tend to make excellent grinding compounds which can wear grooves into the bearing surface. If these grooves become sufficiently deep, the integrity of the track seal assembly can be compromised and abrasive particles can enter the track joint. These grooves also provide a path for lubricants contained within the track joint to leak out. All of the above discussed problems can result in the failure of the track joint and thus the track chain. Once the track chain assembly fails, the various parts thereof must be replaced in a piece part manner and the track chain reassembled. The process of removing the worn parts of the track chain then reassembling the same requires a significant amount of time and thus decreases the productivity of the work machine.

The present invention is directed to overcoming one or more of the problems or disadvantages associated with the prior art.

SUMMARY OF THE INVENTION

In accordance with one embodiment of the present invention, there is provided a cartridge assembly for a track chain. The cartridge assembly includes (i) a track pin having a longitudinal axis, (ii) a first collar having a first bore defined therethrough, the first collar being positioned relative to the track pin such that a first portion of the track pin is disposed within the first bore, (iii) a second collar having a second bore defined therethrough, the second collar being positioned relative to the track pin such that a second portion of the track pin is disposed within the second bore, (iv) a first track link having a first hole defined therein, the first track link being positioned relative to the first collar such that the first collar is disposed within the first hole of the first track link, and (v) a second track link having a second hole defined therein, the second track link being positioned relative to the second collar such that the second collar is disposed within the second hole of the second track link. The first collar is fixed in relation to the track pin such that first collar is unable to rotate relative to the track pin. The first track link is fixed in relation to the first collar such that the first track link is unable to rotate relative to the first collar. The second collar is able to rotate relative to the track pin around the longitudinal axis. The second track link is fixed in relation to the second collar such that the second track link is unable to rotate relative to the second collar.

In accordance with another embodiment of the present invention, there is provided an undercarriage assembly for a track type work machine. The undercarriage assembly includes a frame and an idler wheel operatively coupled to the frame. The undercarriage assembly also includes a track chain operatively coupled to the frame and the idler wheel. The track chain includes a cartridge assembly having (i) track pin having a longitudinal axis, (ii) a first collar having a first bore defined therethrough, the first collar being positioned relative to the track pin such that a first portion of the track pin is disposed within the first bore, (iii) a second collar having a second bore defined therethrough, the second collar being positioned relative to the track pin such that a second portion of the track pin is disposed within the second bore, (iv) a first track link having a first hole defined therein, the first track link being positioned relative to the first collar such that the first collar is disposed within the first hole of the first track link, (v) a second track link having a second hole defined therein, the second track link being positioned relative to the second collar such that the second collar is disposed within the second hole of the second track link, (vi) the first collar fixed in relation to the track pin such that first collar is unable to rotate relative to the track pin, (vii) the first track link fixed in relation to the first collar such that the first track link is unable to rotate relative to the first collar, (viii) the second collar able to rotate relative to the track pin around the longitudinal axis, and (ix) the second track link fixed in relation to the second collar such that the second track link is unable to rotate relative to the second collar.

In accordance with yet another embodiment of the present invention, there is provided a work machine. The work machine includes a frame and an undercarriage assembly operatively coupled to the frame. The undercarriage assembly includes a track chain having a cartridge assembly. The cartridge assembly has (A) a track pin having a longitudinal axis, (B) a first collar having a first bore defined therethrough, the first collar being positioned relative to the track pin such that a first portion of the track pin is disposed within the first bore, (C) a second collar having a second bore defined therethrough, the second collar being positioned relative to the track pin such that a second portion of the track pin is disposed within the second bore, (D) a first track link having a first hole defined therein, the first track link being positioned relative to the first collar such that the first collar is disposed within the first hole of the first track link, (E) a second track link having a second hole defined therein, the second track link being positioned relative to the second collar such that the second collar is disposed within the second hole of the second track link, (F) the first collar fixed in relation to the track pin such that the first collar is unable to rotate relative to the track pin, (G) the first track link fixed in relation to the first collar such that the first track link is unable to rotate relative to the first collar, (H) the second collar able to rotate relative to the track pin around the longitudinal axis, and (I) the second track link fixed in relation to the second collar such that the second link is unable to rotate relative to the second collar.

DETAILED DESCRIPTION

Figure 1:
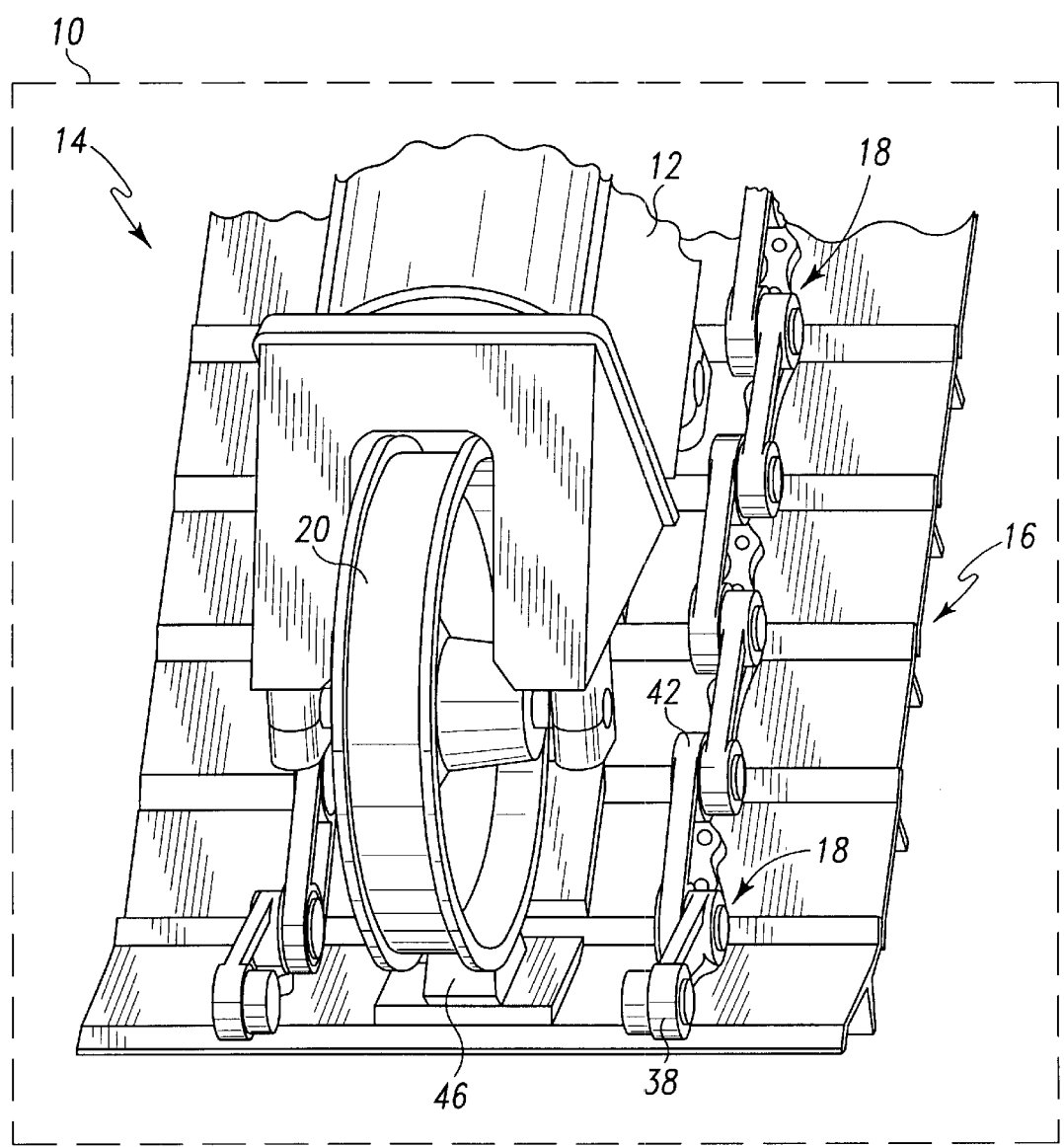
FIG. 1 is a schematic representation of a work machine showing a fragmentary perspective view of an undercarriage assembly thereof.
Figure 2:
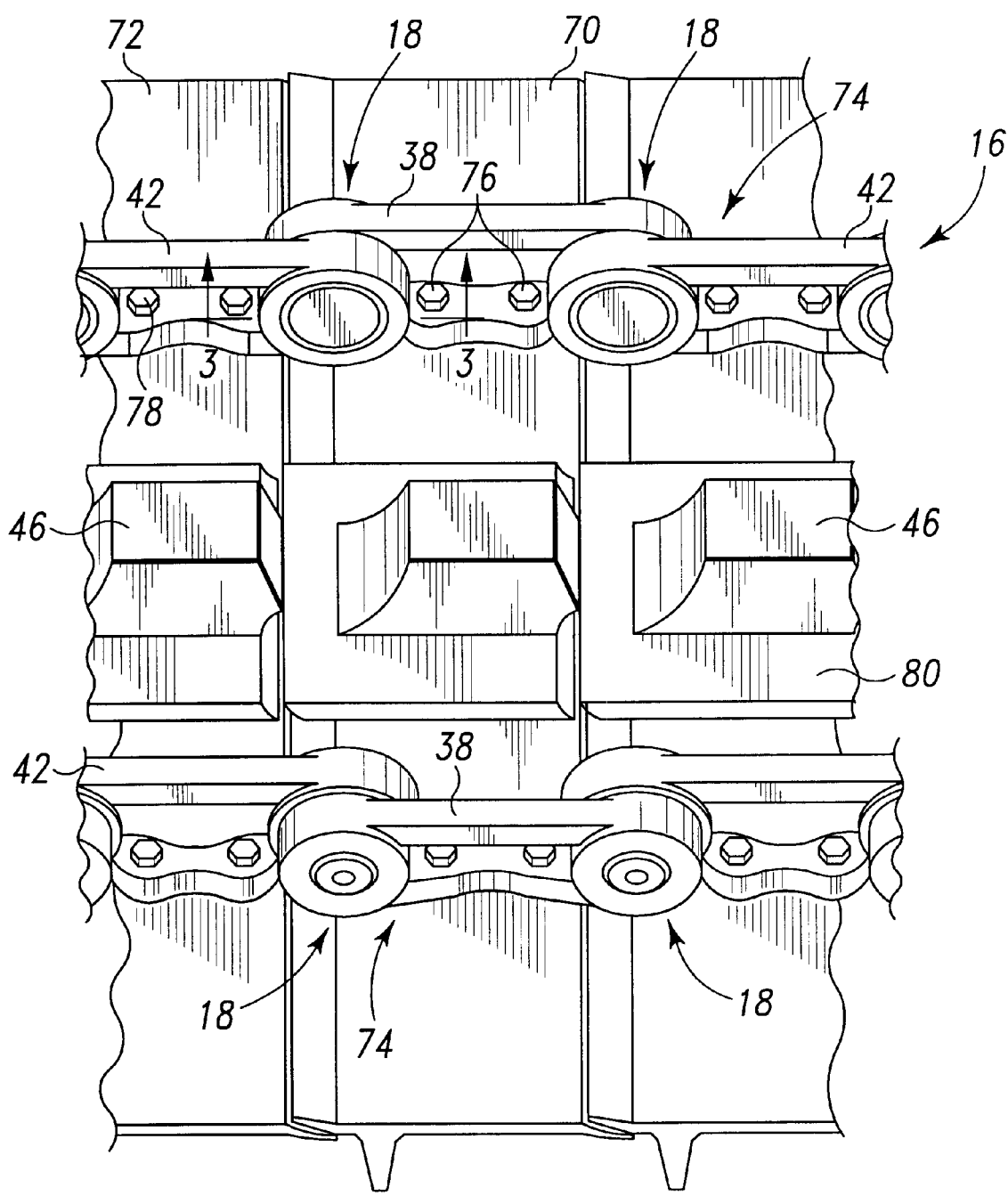
FIG. 2 is a fragmentary perspective view of the track chain of the undercarriage assembly of FIG. 1.

Referring now to FIGS. 1 and 2 there is shown an exemplary work machine 10 which incorporates the features of the present invention therein. Work machine 10 includes an undercarriage assembly 14 having a frame 12 operatively coupled to the work machine 10. Undercarriage assembly 14 includes an idler wheel 20 and a track chain 16. Track chain 16 includes a number of (i) track links 38 and 42, (ii) cartridge assemblies 18, and (iii) track shoes 70 and 72. Track chain 16 also includes a number of drive lugs 46.

Figure 3:
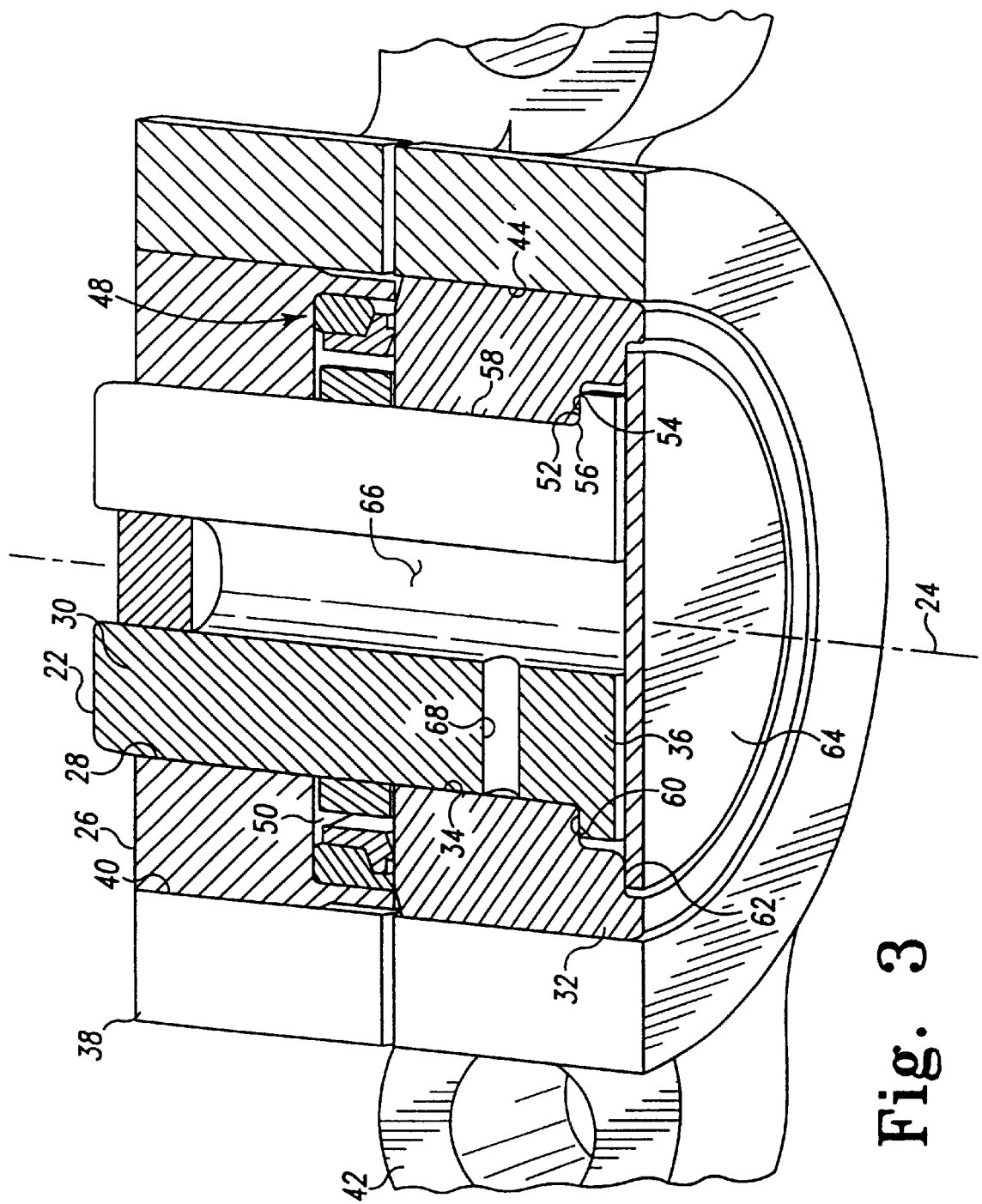
FIG. 3 is a perspective cross sectional view of a cartridge assembly of the track chain of FIG. 2 taken along line 3—3 of FIG. 2.

Now referring to FIG. 3, cartridge assembly 18 includes a track pin 22 having a longitudinal axis 24. Track pin 22 also has a lip member 56 which extends outwardly from an exterior surface 58 of track pin 22. Lip member 56 has a thrust surface 60 defined thereon. Track pin 22 can also have a reservoir 66 and a channel 68 defined therein. Channel 68 is in fluid communication with reservoir 66 and exterior surface 58 of track pin 22 so that a fluid, such as a lubricant, disposed within reservoir 66 is advanced through channel 68 and onto exterior surface 58 during use of cartridge assembly 18.

Cartridge assembly 18 also includes a collar 26 having a bore 28 defined therethrough. Collar 26 is positioned relative to track pin 22 such that a portion 30 of track pin 22 is disposed within bore 28. Cartridge assembly 18 also includes a collar 32 having a bore 34 defined therethrough. Collar 32 also has a shoulder portion 52 and a shoulder portion 62 defined thereon. Shoulder portion 52 has a thrust portion surface 54 defined thereon. Collar 32 is positioned relative to track pin 22 such that a portion 36 of track pin 22 is disposed within bore 34. Collar 32 is further positioned relative to track pin 22 so that thrust surface 54 is in contact with thrust surface 60.

Cartridge assembly 18 further includes (i) a cap 64, (ii) a track link 38, and (iii) a track link 42. Note that track links 38 and 42 are substantially identical to each other. Track link 38 has a hole 40 defined therein. Track link 42 has a hole 44 defined therein. Track link 38 is positioned relative to collar 26 such that collar 26 is disposed within hole 40 of track link 38. Track link 42 is positioned relative to collar 32 such that collar 32 is disposed within hole 44 of track link 42. Cap 64 is secured to collar 32 (e.g. by welding) so that cap 64 is in contact with shoulder portion 62 of collar 32.

Still referring to FIG. 3, cartridge assembly 18 further includes a seal arrangement 48. In particular, seal arrangement 48 is positioned in a seal groove 50 defined collar 26 so that seal arrangement 48 contacts collar 26 and collar 32.

It should be understood that collar 26 is fixed in relation to track pin 22 such that collar 26 is unable to rotate relative to track pin 22. For example, track pin 22 can be press fit into bore 28 of collar 26 so as to substantially prevent relative rotation between these two components. In addition, track link 38 is fixed in relation to collar 26 such that track link 38 is unable to rotate relative to collar 26. For example, collar 26 can be press fit into hole 40 of track link 38 so as to substantially prevent relative rotation between these two components.

On the other hand, collar 32 is able to rotate relative to track pin 22 around longitudinal axis 24. Track link 42 is fixed in relation to collar 32 such that track link 42 is unable to rotate relative to collar 32. For example, as described above, collar 32 can be press fit into hole 44 of track link 42 so as to substantially prevent relative rotation between these two components.

As shown in FIG. 2, a number of track links 38 and 42 are secured to each other in the above described manner to form a pair of adjacent chains 74 each of which form a closed loop. A track shoe is secured to each track link 38 and 42. In particular, as shown in FIG. 2, a track shoe 70 is secured to track link 38 by, for example, bolting track shoe 70 to track link 38 via bolt holes 76. In a similar manner, a track shoe 72 is secured to track link 42 by bolting track shoe 72 to track link 42 via bolt holes 78. A plate 80 is attached to each track shoe 70 and 72 (e.g. via bolts) so that each plate 80 is interposed adjacent chains 74. In addition, a drive lug 46 is attached to each plate 80.

It should be understood that the above described track chain 16 forms a closed loop which is positioned around a drive sprocket (not shown) and idler wheel 20 of work machine 10 such that idler wheel 20 is in contact with drive lug 46. During use of work machine 10 the drive sprocket rotates and engages the track chain 16, thereby causing the track chain 16 to rotate around a path defined by the drive sprocket and idler wheel 20. The rotation of track chain 16 causes work machine 10 to be propelled over the ground so as to perform various work functions.

Industrial Applicability

It should be appreciated that each cartridge assembly 18 has many advantages which facilitate the functioning of track chain 16 and therefore work machine 10. For example, each cartridge assembly 18 enhances the life of track chain 16 by improving the retention of a lubricant contained within cartridge assembly 18. Moreover, since each cartridge assembly 18 is self-contained and provides essentially all of the sealing and bearing functions required by track chain 16, track chain 16 can be easily serviced by removing old worn cartridge assemblies 18 and replacing them with new cartridge assemblies 18. Removing and replacing the entire cartridge assembly 18 to service track chain 16 is more cost effective and efficient as compared to other track chain designs which require servicing in a piece part manner.

Other aspects and features of the present invention can be obtained from a study of the drawings, the disclosures, and the appended claims.

What is claimed is:

1. A cartridge assembly for a track chain, comprising:
   track pin having a longitudinal axis;
   a first collar having a first bore defined therethrough, said first collar being positioned relative to said track pin such that a first portion of said track pin is disposed within said first bore;
   a second collar having a second bore defined therethrough, said second collar being positioned relative to said track pin such that a second portion of said track pin is disposed within said second bore;
   a first track link having a first hole defined therein, said first track link being positioned relative to said first collar such that said first collar is disposed within said first hole of said first track link; and a second track link having a second hole defined therein, said second track link being positioned relative to said second collar such that said second collar is disposed within said second hole of said second track link, wherein (i) said first collar is fixed in relation to said track pin such that first collar is unable to rotate relative to said track pin, (ii) said first track link is fixed in relation to said first collar such that said first link is unable to rotate relative to said first collar, (iii) said second collar is able to rotate relative to said track pin around said longitudinal axis, and (iv) said second track link is fixed in relation to said second collar such that said second track link is unable to rotate relative to said second collar.

2. The cartridge assembly of claim 1, including:

a seal arrangement interposed said first collar and said second collar so that said seal arrangement is in contact with said first collar and said second collar.

3. The cartridge assembly of claim 2, wherein:

said first collar has a seal groove defined therein and said seal arrangement is located within said seal groove.

4. The cartridge assembly of claim 1, wherein:

said second collar has a first shoulder portion defined thereon, said first shoulder portion has a first thrust surface defined thereon, said track pin has a lip member which extends outwardly from an exterior surface of said track pin, said lip member has a second thrust surface defined thereon, and said first thrust surface is in contact with said second thrust surface.

5. The cartridge assembly of claim 4, wherein said second collar has a second shoulder portion defined thereon, including:

a cap secured to said second collar so that said cap is in contact with said second shoulder portion.

6. The cartridge assembly of claim 1, wherein:

said track pin has (i) a reservoir defined therein, (ii) a channel defined therein, and (iii) an exterior surface, and said channel is in fluid communication with both said reservoir and said exterior surface of said track pin so that a fluid contained within said reservoir is advanced from said reservoir onto said exterior surface of said track pin.

7. The cartridge assembly of claim 1, including:

a first track shoe secured to said first track link.

8. The cartridge assembly of claim 7, including:

a second track shoe secured to said second track link.

9. The cartridge assembly of claim 7, including:

a drive lug secured to said first track shoe.

10. An undercarriage assembly for a track type work machine, comprising:

a frame;

an idler wheel operatively coupled to said frame; and a track chain operatively coupled to said frame and said idler wheel, wherein said track chain includes a cartridge assembly having (i) track pin having a longitudinal axis, (ii) a first collar having a first bore defined therethrough, said first collar being positioned relative to said track pin such that a first portion of said track pin is disposed within said first bore, (iii) a second collar having a second bore defined therethrough, said second collar being positioned relative to said track pin such that a second portion of said track pin is disposed within said second bore, (iv) a first track link having a first hole defined therein, said first track link being positioned relative to said first collar such that said first collar is disposed within said first hole of said first track link, (v) a second track link having a second hole defined therein, said second track link being positioned relative to said second collar such that said second collar is disposed within said second hole of said second track link, (vi) said first collar fixed in relation to said track pin such that first collar is unable to rotate relative to said track pin, (vii) said first track link fixed in relation to said first collar such that said first track link is unable to rotate relative to said first collar, (viii) said second collar able to rotate relative to said track pin around said longitudinal axis, and (ix) said second track link fixed in relation to said second collar such that said second track link is unable to rotate relative to said second collar.

11. The undercarriage assembly of claim 10, including:

a seal arrangement interposed said first collar and said second collar so that said seal arrangement is in contact with said first collar and said second collar.

12. The undercarriage assembly of claim 11, wherein:

said first collar has a seal groove defined therein and said seal arrangement is located within said seal groove.

13. The undercarriage assembly of claim 10, wherein:

said second collar has a first shoulder portion defined thereon, said first shoulder portion has a first thrust surface defined thereon, said track pin has a lip member which extends outwardly from an exterior surface of said track pin, said lip member has a second thrust surface defined thereon, and said first thrust surface is in contact with said second thrust surface.

14. The undercarriage assembly of claim 13, wherein said second collar has a second shoulder portion defined thereon, including:

a cap secured to said second collar so that said cap is in contact with said second shoulder portion.

15. The undercarriage assembly of claim 10, wherein:

said track pin has (i) a reservoir defined therein, (ii) a channel defined therein, and (iii) an exterior surface, and said channel is in fluid communication with both said reservoir and said exterior surface of said track pin so that a fluid contained within said reservoir is advanced from said reservoir onto said exterior surface of said track pin.

16. The undercarriage assembly of claim 10, including:

a first track shoe secured to said first track link.

17. The undercarriage assembly of claim 16, including:

a second track shoe secured to said second track link.

18. The undercarriage assembly of claim 16, including:

a drive lug secured to said first track shoe.

19. A work machine, comprising:

an undercarriage assembly having a frame operatively coupled to the work machine; and wherein said undercarriage assembly includes a track chain having a cartridge assembly, said cartridge assembly having (A) a track pin having a longitudinal axis, (B) a first collar having a first bore defined therethrough, said first collar being positioned relative to said track pin such that a first portion of said track pin is disposed within said first bore, (C) a second collar having a second bore defined therethrough, said second collar being positioned relative to said track pin such that a second portion of said track pin is disposed within said second bore, (D) a first track link having a first hole defined therein, said first track link being positioned relative to said first collar such that said first collar is disposed within said first hole of said first track link, (E) a second track link having a second hole defined therein, said second, track link being positioned relative to said second collar such that said second collar is disposed within said second hole of said second track link, (F) said first collar fixed in relation to said track pin such that said first collar is unable to rotate relative to said track pin, (G) said first track link fixed in relation to said first collar such that said first track link is unable to rotate relative to said first collar, (H) said second collar able to rotate relative to said track pin around said longitudinal axis, and (I) said second track link fixed in relation to said second collar such that said second track link is unable to rotate relative to said second collar.

20. The work machine of claim 19, including:

an idler wheel operatively coupled to said frame of said undercarriage assembly; and a drive lug secured to said track chain, wherein said idler wheel is in contact with said drive lug.

* * * * *